(12) United States Patent
Foerster et al.

(10) Patent No.: US 7,188,723 B2
(45) Date of Patent: *Mar. 13, 2007

(54) STORAGE CONTAINER FOR DISK-SHAPED INFORMATION CARRIERS WITH UNLOCKING BUTTON

(76) Inventors: Fritz Foerster, Hellhörn 2, 24558 Henstedt-Ulzburg (DE); Joachim Naatz, Ahornweg 8, 24558 Henstedt-Ulzburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 11/013,357

(22) Filed: Dec. 17, 2004

(65) Prior Publication Data

US 2005/0103660 A1 May 19, 2005

Related U.S. Application Data

(63) Continuation of application No. PCT/DE03/01989, filed on Jun. 13, 2003.

(30) Foreign Application Priority Data

Jun. 17, 2002 (DE) .......................... 202 09 379 U

(51) Int. Cl.
*B65D 85/57* (2006.01)
(52) U.S. Cl. .................................... 206/308.1; 206/309
(58) Field of Classification Search ............ 206/308.1, 206/309–310
See application file for complete search history.

(56) References Cited

U.S. PATENT DOCUMENTS

| | | | |
|---|---|---|---|
| 5,533,615 A | * | 7/1996 | McCamy ................. 206/308.1 |
| 5,690,218 A | * | 11/1997 | McCamy et al. ......... 206/308.1 |
| 5,906,274 A | | 5/1999 | McEwan |
| 5,938,020 A | * | 8/1999 | Luckow .................. 206/308.1 |
| 5,996,788 A | * | 12/1999 | Belden et al. .............. 206/310 |
| 6,056,117 A | * | 5/2000 | Courchesne ............. 206/308.1 |
| 6,164,446 A | * | 12/2000 | Law ........................ 206/308.1 |

FOREIGN PATENT DOCUMENTS

| | | |
|---|---|---|
| DE | 19602782 | 7/1997 |
| DE | 19702667 | 4/1998 |
| EP | 0671743 | 9/1995 |

* cited by examiner

*Primary Examiner*—Bryon P. Gehman
(74) *Attorney, Agent, or Firm*—Womble Carlyle

(57) ABSTRACT

A storage container for disk-like information media, such as, for example, CDs and DVDs, has a lower part (1), a cover (2) pivotably connected to the lower part, and an unlocking button (7) which, in the locked state, can be caused to clamp the information medium and/or the cover. In order to ensure secure fixing of the cover (2) in the closed state with the use of the unlocking button (7) and to keep the production costs for the storage container low, the unlocking button (7) is molded onto the lower part (1). The unlocking button (7) preferably has a relatively short limb and a relatively long limb connected to the short limb. The short limb is connected to the base of the lower part, and when the button (7) is in the locked state and the cover (2) is closed, projects away from the base in the direction of the cover. The long limb of the button has a surface which, when the button is in the locked state and the cover closed, is at least in part substantially flush with the upper surface of the cover (2), the relatively short limb of the button (7) being capable of elastic bending deformation in an outward direction as a result of a pressure exerted on the surface of the long limb.

20 Claims, 7 Drawing Sheets

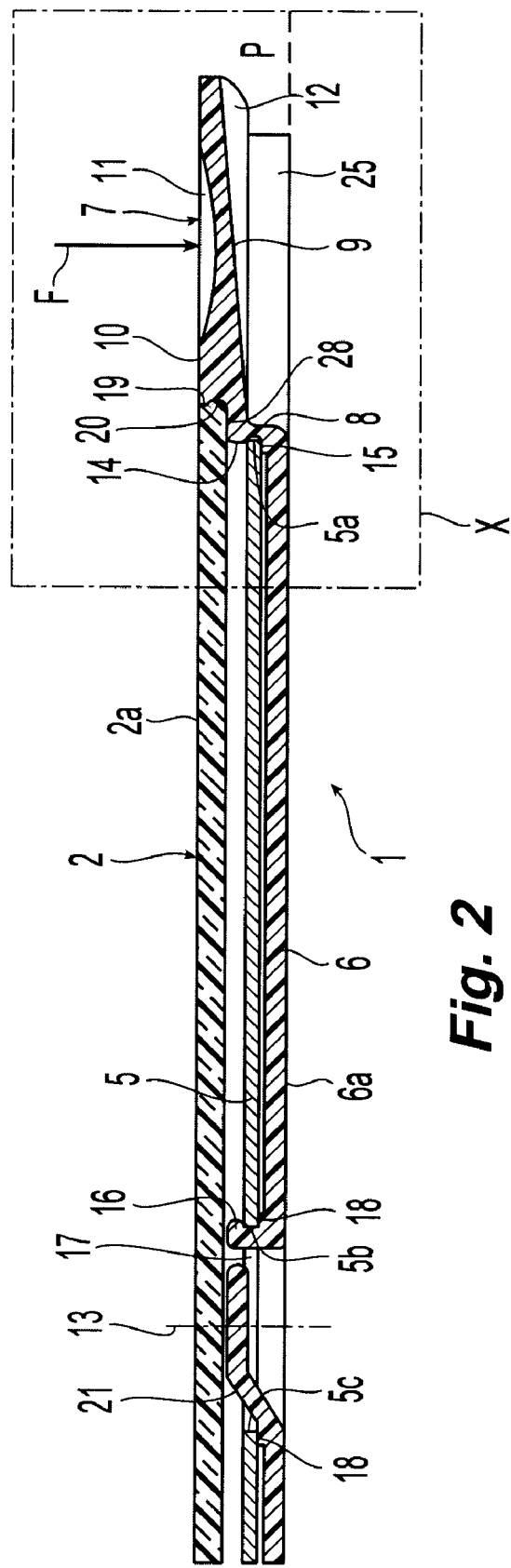
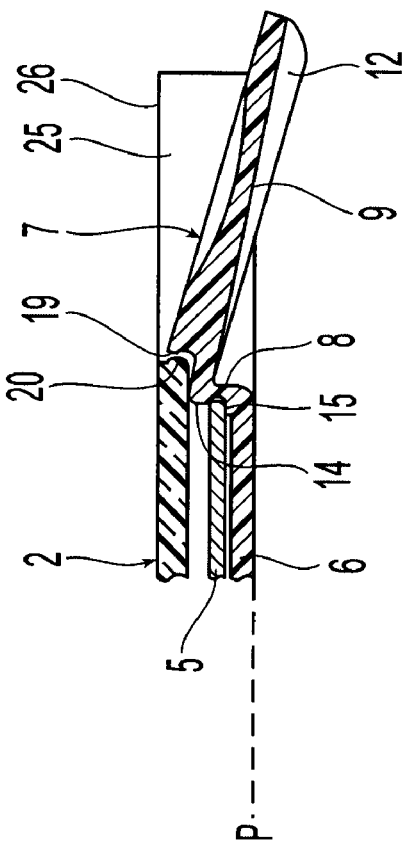

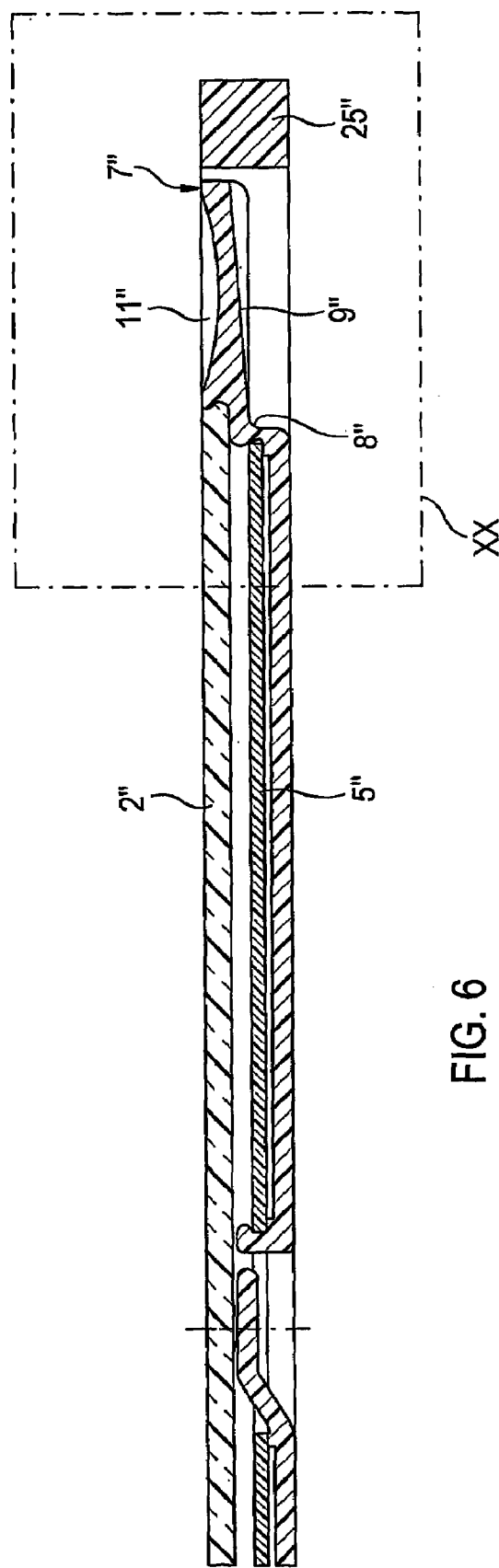
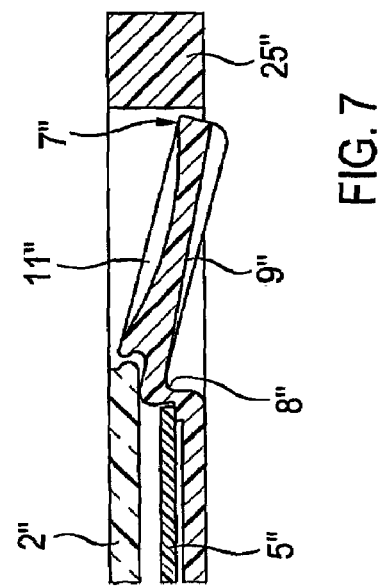
FIG. 6
FIG. 7

STORAGE CONTAINER FOR DISK-SHAPED INFORMATION CARRIERS WITH UNLOCKING BUTTON

RELATED APPLICATIONS

This is a Continuation of International Application No. PCT/DE03/01989, filed Jun. 13, 2003, now pending, which published as WO 03/107344, and claims priority to DE 202 09 379.4, filed Jun. 17, 2002. The contents of the aforementioned International Application and German application are incorporated by reference.

BACKGROUND

The invention relates to a storage container for disk-like information media, comprising a lower part, a cover pivotably connected to the lower part, and an unlocking button which, in a closed state, can be caused to clamp the disk-like information medium and/or the cover. "Disk-like information media" is to be understood as meaning chiefly, but not exclusively, compact disks, such as audio CDs, photo CDs, CD-ROM, DVDs or video CDs.

Such a storage container is disclosed in EP-A-0 671 743. In the case of this storage container, an insert which has a receiving trough for the CD is present in the lower part. The unlocking button is molded onto the insert and, in the closed state can be caused to clamp the CD and/or the cover in order to hold the CD in the receiving trough of the insert and/or to lock the cover detachably in its closed position relative to the lower part. Since the insert is arranged in an easily detachable manner in the lower part, and the unlocking button is present in the insert, further retaining means are present on the cover and/or on the lower part, which means, when the cover is in the closed position, produce a direct detachable connection between the cover and the lower part in order to hold the cover securely on the lower part in the closed position.

DE 197 02 667 A1, too, discloses a storage container for disk-like information media, in which a lower part and a cover are pivotably connected to one another, and an unlocking button is provided, which is molded onto an insert which lies in the lower part of the container and has a receiving trough for the disk-like information medium. In the case of this storage container, too, the unlocking button fixes the cover in the closed position to the insert and not directly to the lower part.

The so-called thin storage containers for CDs, which in each case consist only of a lower part and a cover which is pivotably connected to the lower part, are furthermore known, it being possible for the CD to be placed directly in the lower part. By means of retaining elements molded onto the cover and/or the lower part, the cover is held on the lower part in the closed position. Such a storage container has the disadvantage that, as a rule, both hands are required to open the cover, since, while the cover is being swivelled open with one hand, the lower part has to be held with the other hand. Since the CD is as a rule detachably fixed to the lower part, it is necessary to change hands after swivelling open the cover in order to take the CD out of the lower part of the container. The handling of such a container and the removal of the from the container are therefore fairly tedious and entail a certain risk that the CD will be excessively bent on removal from the container and may fall down.

SUMMARY OF THE INVENTION

It is an object of the invention to provide a storage container of the generic type for disk-like information media, so that, with simple handling of the container, secure fixing of the cover in the closed position with the use of the unlocking button is ensured, the production costs being kept low.

The object of the invention is achieved by molding the unlocking button on the lower part.

The advantage of the storage container according to the invention is that the disk-like information medium and/or the cover can be held directly on the lower part by means of the unlocking button, an insert which can be introduced into the lower part and has a receiving trough for the disk-like information medium being dispensable, but, if required, could also be used. If the storage container has no insert for receiving the disk-like information medium, the disk-like information medium is introduced directly into the lower part of the container. The omission of the insert from the storage container reduces the production costs of the container.

Preferably, the unlocking button has a relatively short limb and a relatively long limb connected to the short limb, and the short limb is connected to the base of the lower part and, when the button is in the locked state, and the cover is closed, projects from the base in the direction of the cover, and the long limb of the button has a surface which, when the button is in the locked state and the cover is closed, is at least in part substantially flush with the upper surface of the cover, the relatively short limb of the button being capable of being subjected to an elastic bending deformation in an outward direction by pressure exerted on the surface of the long limb. This has the advantage that the unlocking button can be pressed down more strongly than in the case of the known storage containers described at the outset, in which the unlocking button is molded onto an insert resting in the lower part of the container, because, in contrast to the known storage containers, the pressing down of the unlocking button is not limited by contact with the base of the lower part. Because the button can be pressed down more strongly, it can, when being pressed down, be moved further away from the disk-like information medium and/or the cover, thus facilitating the opening of the cover and the removal of the disk-like information medium from the container. The button itself can be improved in its rigidity by providing one or more reinforcing ribs on the underside of the long limb of the button. Since, in contrast to the known storage containers in which the unlocking button is molded to an insert, in the container according to the invention no further part of the container is present below the long limb of the unlocking button, the reinforcing ribs on the underside of the long limb of the unlocking button also cannot come to rest anywhere on the container on pressing down the button and thus limit the press-down movement of the button.

A transition section which is separated from the unlocking button by a slit and has a surface which is substantially flush with the surface of the long limb of the button when the button is in the locked state is preferably molded onto the base of the lower part. The transition section provides a support surface for a section of the container user's thumb, while another section of this thumb rests on the surface of the long limb of the unlocking button in order to press down the latter if required. At the same time, the user can support the container on the base of the lower part with the index finger and optionally the middle finger. In this way, the cover of the container can be swivelled open by one-hand operation, and the container can be kept stable by means of the operating hand. The slit between the unlocking button and the transition section promotes the mobility of the unlocking button.

The simultaneous opening of the cover and holding of the container with one hand can be even further improved if in each case a transition section is molded onto the base of the lower part, laterally adjacent to the unlocking button, the two transition sections are each separated by a slit from the unlocking button, and the two slits are parallel to the longitudinal direction of the two limbs of the button. In this way, one support surface each for the thumb, with which the unlocking button is simultaneously pressed down, is formed on both sides of the unlocking button.

As an alternative to the arrangement of two transition sections laterally relative to the unlocking button, a single transition section can run on both sides of the unlocking button and behind the free end of the long limb of the unlocking button, and the slit separating the unlocking button from the transition section can have two sections parallel to the longitudinal direction of the limbs of the button and a section behind the free end of the long limb, substantially transverse to the longitudinal direction thereof. In this way, a support surface for the thumb is provided not only on both sides of the long limb of the button but also behind the free end of the long limb of the button.

The slit preferably has two parallel sections which can project laterally next to the connecting point between the short limb of the button and the base of the lower part, a distance into the base of the lower part. By providing the two slit sections in the base of the lower part, that region of the base which is located between the two slit sections is likewise bent when the unlocking button is pressed down. Consequently, stress peaks at the connection point between the short limb of the button and the base of the lower part during pressing down of the button are reduced or avoided because the bending is distributed beyond the connection point over a greater length. The further the slit sections project into the base of the lower part, the more easily can the unlocking button be pressed down and the lower will be the bending stress at the connection point between the short limb of the button and the base of the lower part.

The width of the long limb of the button is preferably less than the width of a thumb pressing on the long limb of the button. Consequently, the thumb can be placed simultaneously on the transition section provided laterally next to the long limb of the button and on the top of the long limb of the button, and the container can be held with support of the fingers resting against the base of the lower part without the button being pressed down with the thumb.

For even easier handling of the storage container according to the invention, it may be advantageous if the unlocking button is provided with a grip recess on its top.

Further features and advantages of the invention are evident from the following description of various embodiments of the invention.

BRIEF DESCRIPTION OF THE DRAWINGS

FIG. 2 shows a section along the line II—II, except that the cover of the storage container has been swivelled closed and the section on the left in FIG. 2 extends only up to the point of the left arrow in FIG. 1;

FIG. 3 shows the cut-out framed with X in FIG. 2, except that the unlocking button is shown in the depressed state;

FIG. 6 shows a section along the line VI—VI in FIG. 5, the cover being shown in the closed position and the unlocking button being shown in the locked state;

FIG. 7 shows the cut-out framed with XX in FIG. 6, the unlocking button being shown in the depressed state;

DETAILED DESCRIPTION OF THE INVENTION

Figure 1:
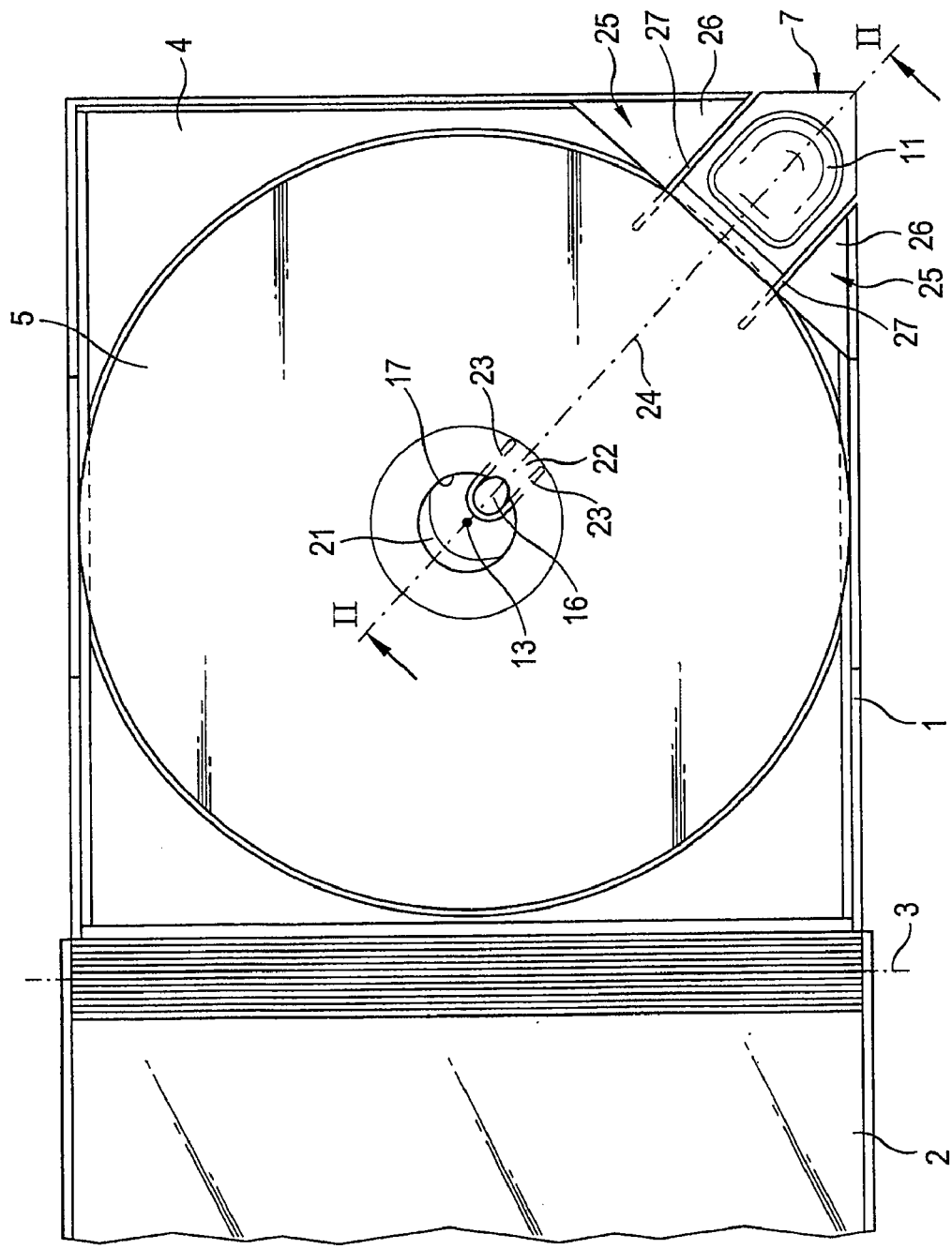
FIG. 1 shows a plan view of the storage container with the cover swivelled open and shown in cut-away form, it being possible to see a CD which has been placed in the lower part of the container.

As is evident from FIGS. 1 to 3, a storage container for a disk-like, or disk-shaped, information medium, such as a CD, has a lower part 1 and a cover 2, which is pivotably connected to the lower part 1. The pivot axis is designated by 3. The lower part has a receiving trough 4 into which a CD 5 is introduced. The lower part 1 has a base 6 onto which an unlocking button 7 is molded in a corner of the container. The base has a lower surface 6a which forms an exterior of the storage container. As is evident from FIG. 2, the unlocking button 7 consists of a short limb 8 which is integral with the base 6 of the lower part 1, and a long limb 9, which is integral with the short limb 8. When the limb 7 is in the locked state as shown in FIG. 2 and cover 2 is in the closed state, the short limb 8 projects away from the base 6 of the lower part 1 in the direction of the cover 2. The long limb 9 of the button 7 extends substantially in the same direction as the closed cover 2, away from the latter, and has a surface 10 which, when the button 7 is in the locked state and cover 2 is closed, is partly flush with the upper surface 2a of the cover 2. A grip recess 11 into which the ball of the thumb can be placed when the button 7 is operated with a user's thumb is present in the surface 10 of the long limb 9 of the button 7. Present on the underside of the long limb 9 of the button 7 is a reinforcing rib 12 which is molded onto the limb 9, extends in the longitudinal direction of the long limb 9 of the button 7 and serves for reinforcing the long limb 9 of the button 7 so that, when the button 7 is pressed down with the user's thumb, the long limb 9 of the button is not substantially deformed.

Present on the inside of the unlocking button 7, facing the central axis 13 of the lower part 1, more precisely in the region of the transition between the short limb 8 and the long limb 9, is a first retaining cam 14 which, as shown in FIG. 2, when the button 7 is in the locked state and CD 5 has been introduced, grips over an outer edge section 5a of the CD 5 from above and presses said section gently against a support surface 15 which forms the surface of a support molded on the base 6 and is slightly raised relative to the inner surface of the base 6 of the lower part 1.

In the diametrical direction relative to the retaining cam 14, there is a further retaining cam 16 which is connected to the base 6 of the lower part 1, grips over an inner edge section 5b of the CD 5, at the central hole 17 of the CD 5, and presses said section gently against a further support surface 18 which forms the top of a further support molded onto the base 6 and is the same distance away from the inner surface of the base 6 of the lower part 1 as the support surface 15. The support surface 18 is annular and runs coaxially around the central axis 13 of the lower part 1. The CD 5 rests with its inner edge bounding the central hole 17 on the side facing the base 6 of the lower part 1, all round on the support surface 18. Because the CD 5 rests against the retaining cams 14 and 16 and the support surfaces 15 and 18, the CD 5 is held securely and in a centered position in the lower part 1 when the button 7 is in the locked state.

The retaining cam 16 can also be formed in such a way that the CD 5 is not clamped at its inner edge but is fixed without pressure. Furthermore, the retaining cam 16 can undergo elastic bending deformations so that it can compensate production-related diameter variations of the CD 5 through elastic bending deformation with continuous contact with the inner edge of the CD 5.

A further retaining cam 19 is provided above the retaining cam 14 and displaced radially outward from the retaining cam 14, in the transition region between the short limb 8 and the long limb 9 of the button 7. When the cover 2 is in the closed state and the button 7 is in the locked state, the retaining cam 19 grips over a bead 20 present at the edge of the cover 2 and presses the cover 2 against a support surface 28 which is formed on the top of the retaining cam 14. When the cover 2 is closed and the button 7 is in the locked state, the cover 2 is thus held securely on the lower part 1 by the clamping action of the button 7.

When the button 7 is pressed down with the user's thumb, which is shown schematically in FIG. 2 by a force arrow F, the retaining cams 14 and 19 are moved outward from the CD 5 and the cover 2, respectively, with the result that the CD 5 and the cover 2 are released from their clamping with the unlocking button 7 and the cover can be swivelled away upward and, after the cover 2 has been opened, the CD 5 can be removed from the lower part 1 in an upward direction.

FIG. 3 shows the unlocking button 7 in the depressed state. It is also evident from FIG. 3 that the long limb 9 of the button 7 is not deformed in the depressed state, whereas the short limb 8 is bent back relative to the base 6 of the lower part 1. The bending deformation of the short limb 8 of the button 7 is an elastic deformation which results in the short limb 8 and the long limb 9 automatically moving back to their substantially undeformed state shown in FIG. 2, after the force applied to the button 7 has been relieved. Furthermore, it is evident from FIG. 3 that the long limb 9 of the button 7 can be depressed, at its rear end a distance away from the short limb 8, below the plane P in which the lower surface 6a of the base 6 of the lower part 1 lies, without the long limb 9 and the reinforcing rib 12 borne by it resting against any other point of the container and thus limiting the pressing down of the button 7. Thus, as seen in FIG. 2, when the button 7 is in the locked position, the long limb 9 is normally spaced apart from the plane P; as seen in FIG. 3, when downward pressure is applied to the button 7 to open the cover 2, at least a portion of the long limb 9 crosses the plane P without contacting remaining portions of the container. In comparison with the prior art described at the outset, the retaining cams 14 and 19 are moved further away from the CD 5 or the cover 2, with the result that the CD 5 and the cover 2 can move past the retaining cams 14 and 19, respectively, without contact.

Diametrically opposite the retaining cam 16 is a ramp 21 which is molded onto the base 6 of the lower part and on which the CD 5 can slide up with an inner edge section 5c, which is diametrically opposite the inner edge section 5b over which the retaining cam 16 grips, on removal of the CD 5 from the lower part 1, with the result that the removal of the CD 5 from the lower part 1 is facilitated. Conversely, on insertion of the CD 5 into the lower part 1 by sliding this inner edge section 5c of the CD 5 downwards on the ramp 21, the CD 5 is more easily brought into the desired position.

As shown in FIG. 1, the retaining cam 16 is present at the free end of a tongue 22 which is molded onto the base 6 and is bounded by two parallel slits 23 which, in the base 6 of the lower part 1, are parallel to an imaginary line 24 intersecting the central axis 13 and passing through the middle of the button 7. As a result of the arrangement of the retaining cam 16 at the free end of the tongue 22 bounded by the two slits 23, the elastic flexural deformability of the retaining cam 16 is increased so that tolerances in the diameter of the CD 5 can be better compensated.

As is further shown in FIG. 1, two transition sections 25 which are triangular in plan view and in each case are integral with the base 6 of the lower part 1 are present laterally next to the button 7. Each of the transition sections 25 has an upper surface 26 which, as shown in FIG. 2 and FIG. 3, is flush with the upper surface 10 of the long limb 9 of the button 7 when the button 7 is in the locked state. When the cover 2 is closed, the surface 26 of the transition sections 25 is also flush with the upper surface 2a of the cover 2. The transition sections 25 are separated from the unlocking button 7 by two parallel slits 27 which project a distance into the base 6 of the lower part 1, as shown in FIG. 1. The slits 27 are parallel to the line 24 passing through the central axis 13 and the middle of the button 7. Those sections of the slits 27 which run into the base 6 of the lower part 1 improve the flexural deformability of the short limb 8 of the button 7 and reduce the risk of the occurrence of stress peaks at the connection point between the short limb 8 of the button 7 and the base 6 of the lower part 1. By means of a greater length of those sections of the slits 27 which project into the base 6 of the lower part 1, the unlocking button 7 can be pressed down more easily, whereas the pressing down of the unlocking button 7 requires slightly greater applied force if these sections of the slits 27 are shorter. The flexural deformability of the retaining cam 16 is likewise variable by means of the length of the slits 23.

The upper surface 26 of the transition sections 25 serves as an additional support surface for the thumb with which the button 7 is depressed. By shifting the pressure of the thumb to the transition sections 25, it is possible to hold the container without the unlocking button 7 being depressed. If, on the other hand, the pressure of the thumb is concentrated on the surface 10 of the long limb 9 of the button 7, the unlocking button 7 is depressed, additional support of the container being provided by placing the thumb on the transition sections 25.

The width of the long limb 9 of the unlocking button 7 is chosen so that a thumb of "normal width" is broader than the long limb 9 of the button 7 and consequently can rest on the long limb 9 and additionally laterally on one or both transition sections 25. Expressed in specific numbers, the width of the long limb 9 of the unlocking button 7 which is chosen in this manner is in the range from 1 to 3 cm or 1.5 to 2.5 cm. Because the width of the long limb 9 is smaller than the width of a thumb of "normal width", the pressing down of the unlocking button 7 can be limited because, by virtue of resting on the lateral transition sections 25, the thumb is prevented from moving completely between the two transition sections 25 when the button 7 is pressed down. In this way, the button 7 is protected from excessive bending, which could lead to breakage.

All parts of the storage container according to the invention consist of plastic which has a resilience such that the desired elastic bending deformation of the corresponding parts can also occur during the use of the container in the manner described.

Figure 4:
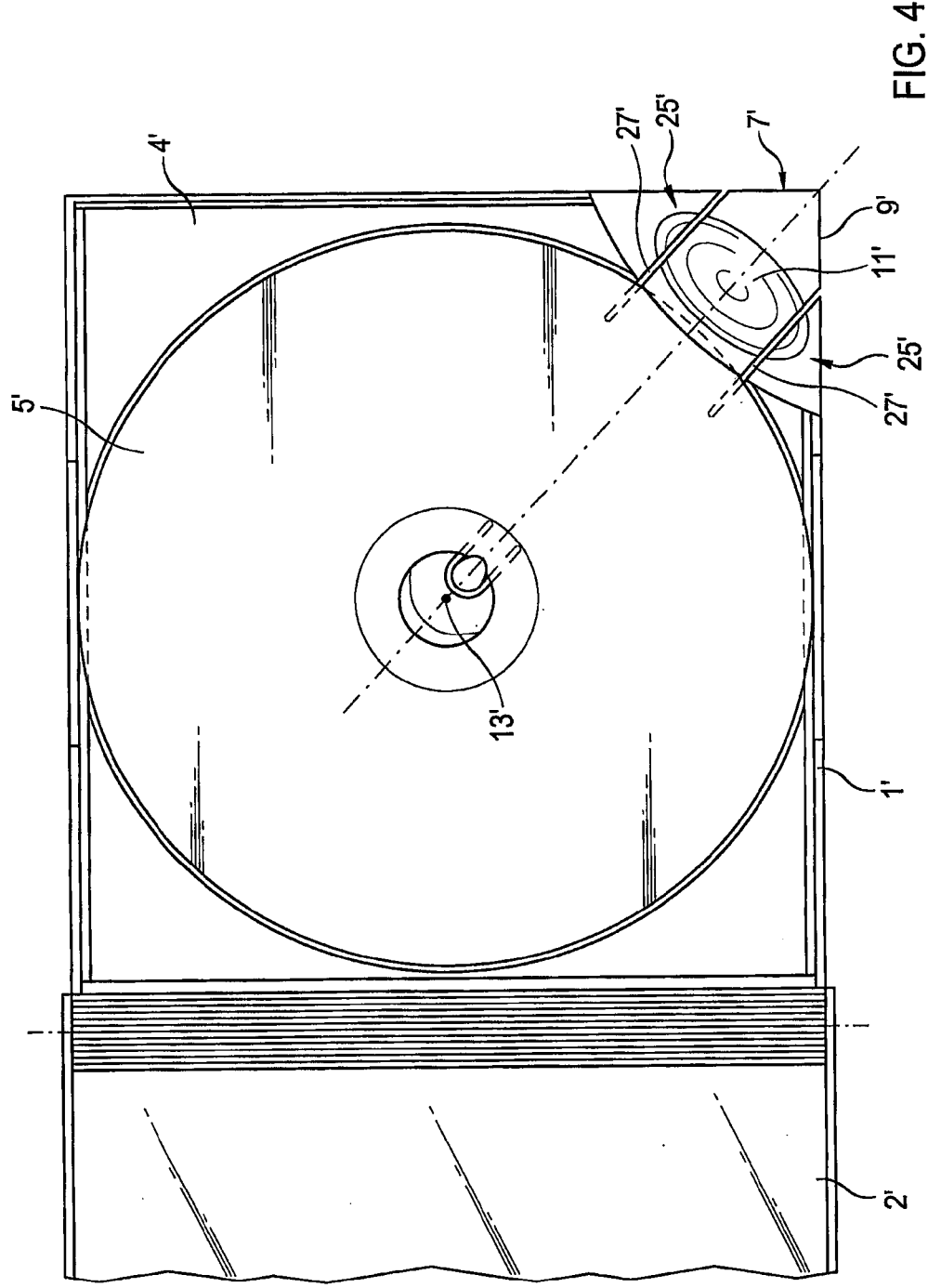
FIG. 4 shows a further embodiment of the invention in a diagram similar to FIG. 1.

The embodiment shown in FIG. 4 differs from the embodiment shown in FIGS. 1 to 3 only slightly in the shape and size of the unlocking button, of the transition sections and of the gripping recess. The following description is therefore limited to the differences of these parts which, to distinguish them from the corresponding parts of the first embodiment, are designated by reference numerals having a prime, the reference numerals being the same as those used for the corresponding part of the embodiment shown in FIGS. 1 to 3.

As shown in FIG. 4, the gripping recess formed in the surface of the long limb 9' of the button 7' extends into the lateral transition sections 25', the gripping recess 11' being as a whole oval in plan view. Those sections of the gripping recess 11' which lie in the transition sections 25' are separated from that section of the gripping recess 11' which is present in the surface of the long limb 9' by the parallel slits 27' which run between the transition sections 25' and the two limbs of the button 7' and project a distance into the base of the lower part 1'. That inner side of the unlocking button 7' which faces the central axis 13' has an arc shape whose curvature corresponds to that of the adjacent upper edge of the gripping recess 11'. The inside of the transition sections 25' which faces the receiving trough 4' of the lower part 1' likewise has an arc shape, which is a continuation of the arc shape of the inner side of the unlocking button 7'. When the button 7' is in the locked state, the upper edges of that section of the gripping recess 11' which is arranged in the long limb 9', which edges run along the slits 27', are raised relative to the upper edges of the sections of the gripping recess 11' which lie in the transition sections 25', which edges run along the slits 27'. Only as a result of pressing down the button 7' by a certain amount is this height difference between those edges of the gripping recess sections which run along the slits 27' compensated. Once this height difference has been compensated, the user feels, with the thumb pressing down the button 7', a smooth transition between the sections of the gripping recess 11'. The shape of the gripping recess 11' has then adapted to the ball shape of the thumb. This correspondence of the ball shape of the thumb and the shape of the griping recess 11' indicates to the user that the button need not be pressed down further in order to open the cover 2' and to be able to remove the CD 5' from the lower part 1'. The pressing down of the unlocking button 7' is thus limited by the user himself by virtue of the fact that he stops pressing the button 7' when he notices that the transition between the sections of the gripping recess 11' is smooth.

Figure 5:
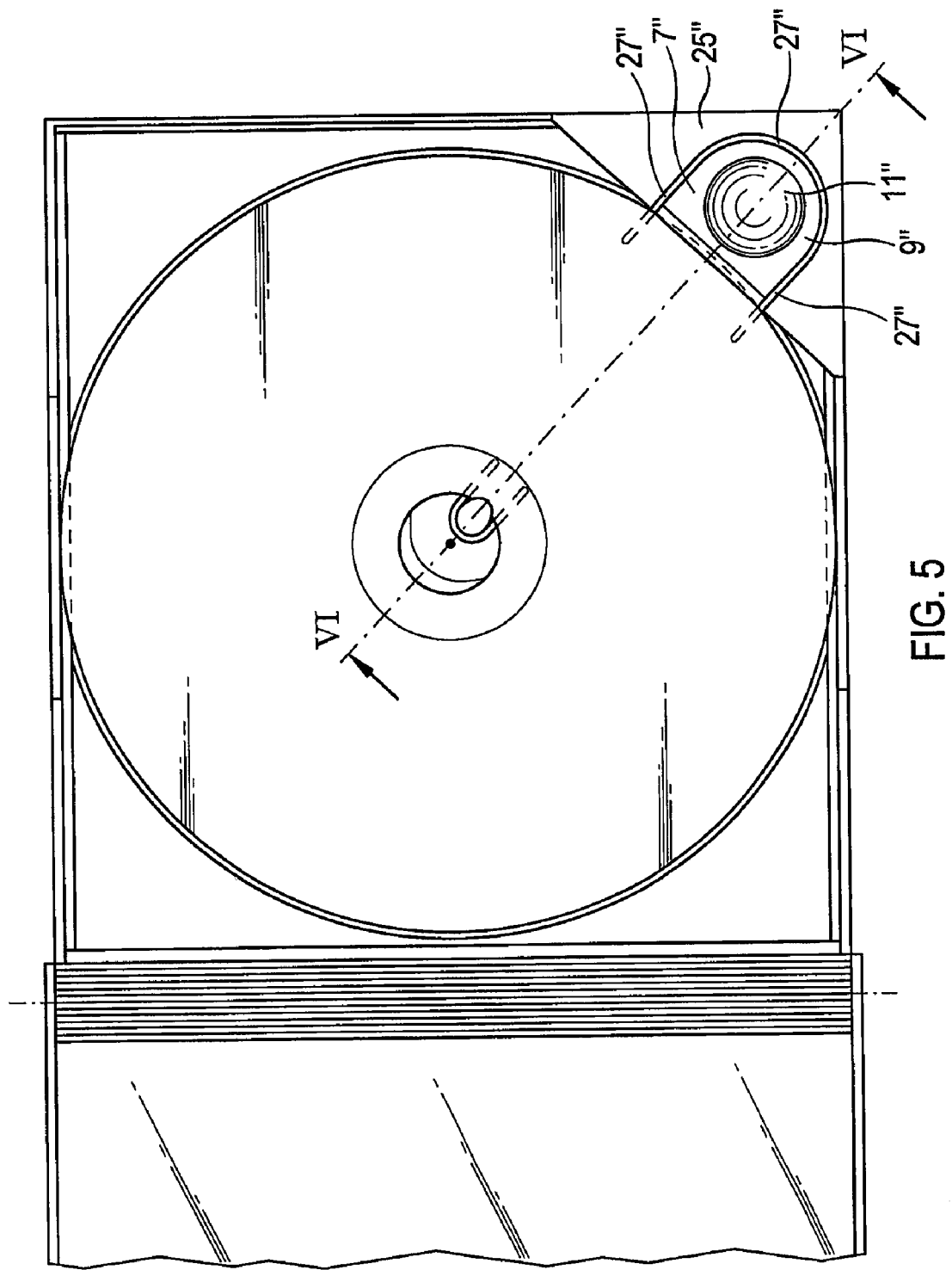
FIG. 5 shows a further embodiment of the invention in a diagram similar to FIG. 1.

A third embodiment of the embodiment of the invention is shown in FIGS. 5 to 7. This embodiment, too, differs from the embodiment shown in FIGS. 1 to 3 only in the shape and size of the unlocking button, of the transition section and of the gripping recess. Instead of two transition sections, as in the first and second embodiment, only a single transition section is provided in the third embodiment. The following description is therefore once again limited only to an explanation of the differences, the same reference numerals with two primes being used for the corresponding parts.

As shown in FIG. 5, there is only a single transition section 25" which extends along the side of the unlocking button 7" and behind the free end of the long limb 9" of the button 7". The two lateral parts of the transition section 25" are separated from the unlocking button 7" by two parallel slit sections 27", whereas that part of the transition section 25" which is located behind the free end of the long limb 9" is separated by a further slit section 27" substantially transverse to the longitudinal direction of the long limb 9". The rear free end of the long limb 9" is rounded. Correspondingly rounded is that edge of the transition section 25" which is opposite the free end of the long limb 9". In plan view, as shown in FIG. 5, the slit sections 27" have a U shape overall. The griping recess 11" in the surface of the long limb 9" has a circular upper edge. The long limb 9" of the button 7" is shorter than the long limb 9 or 9' of the button 7 and 7', respectively, of the first and second embodiment. With the same deflection of the long limb 9" and of the long limb 9 or 9', a greater distance is achieved between the first limb 8" and the cover 2" or the CD 5" than in the first and the second embodiment. Conversely, the button 7" need not be pressed as far as in the first and second embodiment in order to achieve the same distance as there between the short limb 8" and the cover 2" or the CD 5".

By continuing the transition section 25" also behind the free end of the long limb 9", the button 7" is even better protected from being pressed down accidentally when the container is handled, since the user's thumb used to press down the button 7" can also rest on that part of the transition section 25" which is located behind the free end of the long limb 9". The user can therefore better control the limitation of the press-down movement of the unlocking button 7" in this embodiment.

Figure 8:
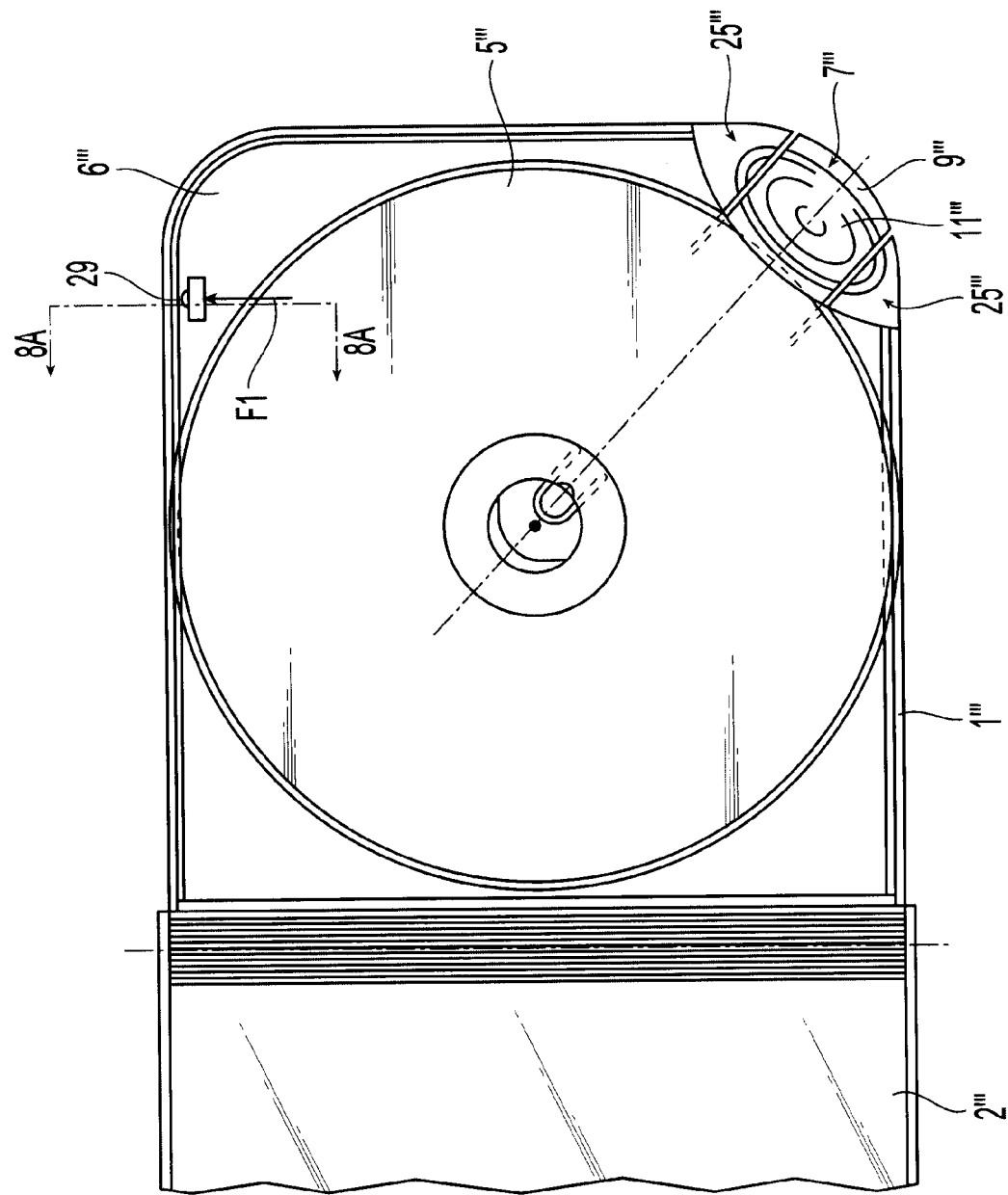
FIG. 8 shows a further embodiment of the invention in a diagram similar to FIG. 1.

FIG. 8 shows a further embodiment which is similar to the embodiment shown in FIG. 4. The reference numerals used for the embodiment shown in FIG. 4 are supplemented by three primes. The following description is once again limited only to the differences.

As shown in FIG. 8, the unlocking button 7''' is rounded on its inside in exactly the same way as the unlocking button 7'. Accordingly, the inside of the two transition sections 25''' arranged at the side of the unlocking button 7''' is also rounded. The gripping recess 11''' is oval in plan view in the same way as the gripping recess 11' and also otherwise corresponds in shape and size to the gripping recess 11' of the embodiment shown in FIG. 4. In contrast to the embodiment shown in FIG. 4, the outside of the long limb 9''' of the button 7''' is rounded in the embodiment shown in FIG. 8. The roundness continues on the outside of the two transition sections 25''', so that there is a completely rounded corner at this point of the container. Accordingly, the opposite corner of the lower part 1''' is rounded. Furthermore, the long limb 9''' is also short like the long limb 9" of the preceding embodiment, so that, in this embodiment too, there is the above-mentioned advantage that either the distance between the short limb and the cover 2''' or the CD 5''' is greater with the same bending of the long limb 9''' and 9 or 9' or the long limb 9''' need not be depressed to such an extent as in the case of the first and second embodiment in order to achieve the same distance.

Figure 8A:
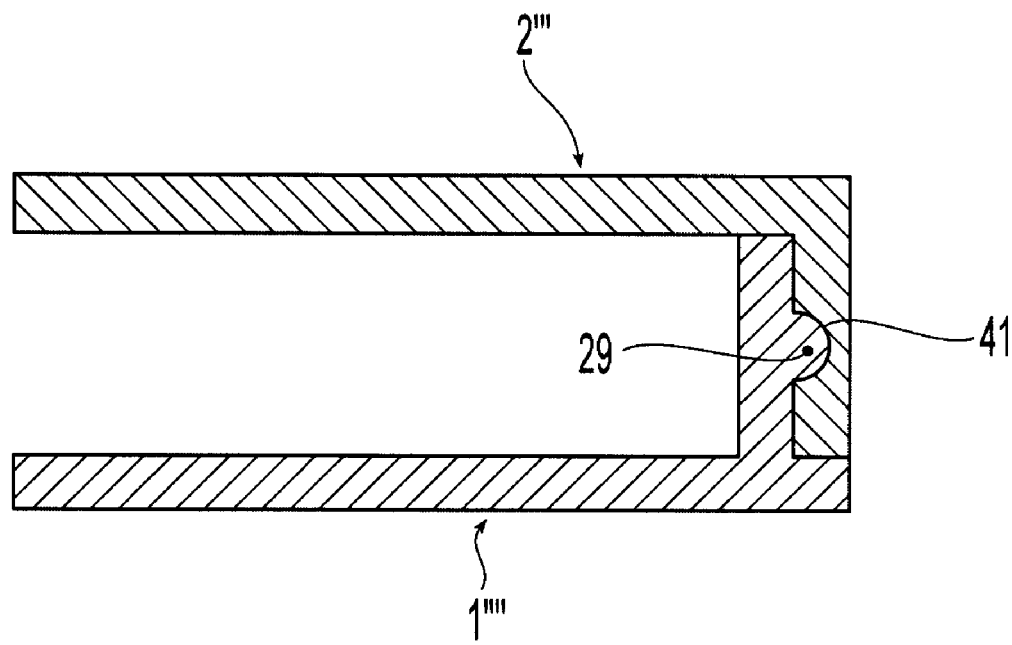
FIG. 8A shows a cross-sectional view of the container of FIG. 8 with the cover 2''' closed, taken along the lines of 8A—8A in FIG. 8.
Figure 8B:
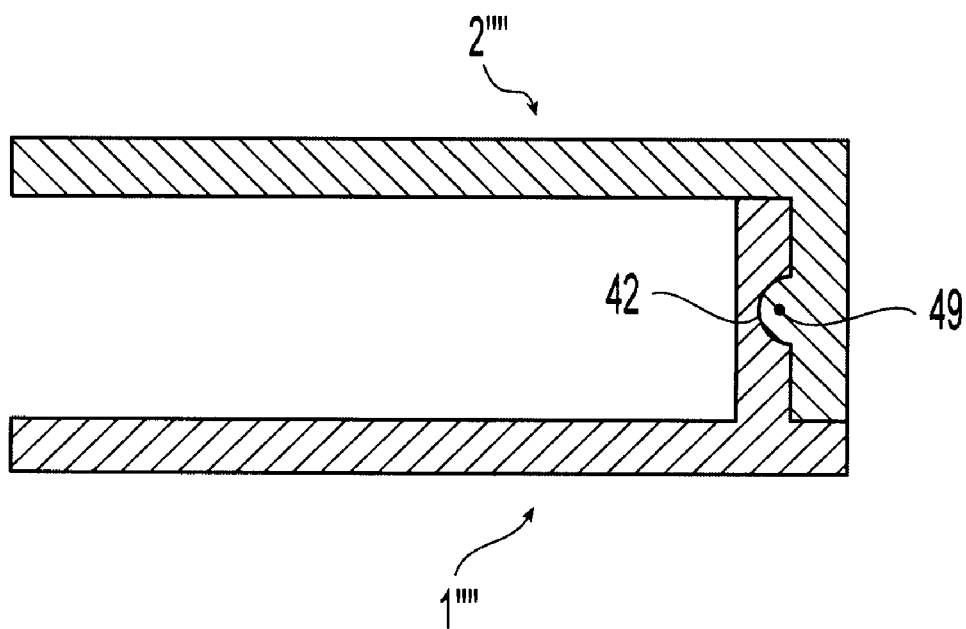
FIG. 8B shows a variation of FIG. 8A in which the cam is formed on the cover instead of on the lower part.

Furthermore, the embodiment shown in FIG. 8 has a retaining element for the cover 2''' in the closed state, in addition to the unlocking button 7'''. This retaining element consists of a cam 29 which is molded onto the base 6''' in the vicinity of that rounded corner of the lower part 1''' which is opposite the unlocking button 7''', which cam 29 snaps into a recess 41 in the cover 2''' when the cover is closed, as seen in FIG. 8A. On closing the cover 2''', the cam 29 is elastically deformed as a result of causing the cam 29 to rest against the surface of the cover 2''' outside the recess, generating a restoring force F1 which forces the cam 29 into the recess as soon as the cam 29 and the recess in the cover 2''' lie one on top of the other. On opening the cover 2''', the cam 29 is once again elastically deformed and then springs back into its original shape as soon as the cover 2''' is moved past the cam 29. Alternatively, as seen in FIG. 8B, the cam 49 can also be molded onto the cover 2''', and the recess 42 is then present in the lower part 1'''. On closing the cover, the cam 49 then once again snaps into the recess, with the result that the cover is provided with additional retention on the lower part 1''' in the closed state at this point.

In both variants, the snapping of the cam into the recess or the retention of the cam in the recess is supported by a force which acts parallel to the force F1 on the cover by clamping by means of the button and which strives to displace the cover slightly in the direction of the cam and of the recess with utilization of the small play in the joints between the lower part and the cover in the plane of the cover. In this way, the cover is held on the lower part at all four corners.

In a further variant, it is possible to cause the cam and the recess to engage one another simply by utilizing the slight displacement of the cover which is effected by the clamping of the cover, and thus to hold the cover firmly on the lower part at four corners.

What is claimed is:

1. A storage container for disk-shaped information media comprising:
    a lower part (1) having a base (6) provided with a lower surface (6a) that forms an exterior of the storage container;
    a cover (2) having an upper surface (2a), the cover being pivotably connected to the lower part to permit the cover to be opened and closed relative to the lower part (1); and
    an unlocking button (7) molded onto the lower part (1), the unlocking button having a first limb (8) and a second limb (9), the first limb (8) being connected to the base (6) and the second limb (9) being connected to the first limb (8), the second limb (9) being longer than the first limb (8), the first limb (8) being capable of elastic bending deformation in an outward direction, when pressure is exerted on a surface (10) of the second limb (9);
    wherein:
    when an item of disk-shaped information medium is present in the container and the unlocking button (7) is in a locked state with the cover (2) closed, the unlocking button (7) clamps both the cover and the disk-shaped information medium;
    when the unlocking button (7) is in a locked state with the cover (2) closed, the lower surface (6a) lies in a plane (P) that is spaced apart from the second limb (9); and
    when pressure is applied to the unlocking button (7) to open the cover (2), at least a portion of the second limb (9) crosses said plane (P) without contacting remaining portions of the storage container.

2. The storage container as claimed in claim 1, wherein:
    when the unlocking button (7) is in the locked state with the cover (2) closed:
        the first limb (8) projects away from the base (6) in a direction of the cover (2); and
        the surface (10) of the second limb (9) is at least in part substantially flush with the upper surface (2a) of the cover (2).

3. The storage container as claimed in claim 2, further comprising first and second transition sections (25) molded onto the base (6), said transition sections being laterally next to the unlocking button (7), said transition sections (25) each being separated from the unlocking button (7) by respective first and second slits (27) which extend along a longitudinal direction of the second limb (9).

4. The storage container as claimed in claim 2, further comprising at least one reinforcing rib (12) formed on an underside of the second limb (9).

5. The storage container as claimed in claim 2, further comprising:
    a retaining cam (16) molded in a vicinity of a central axis (13) of the lower part (1) and located opposite the button (7), and
    a support surface (18) molded onto the base (6);
    wherein:
    when an information medium (5) is introduced into the container, the retaining cam (16) grips over an inner edge section (5b) at a central hole (17) of the information medium (5), the inner edge section (5b) resting on the support surface (18).

6. The storage container as claimed in claim 5, wherein the retaining cam (16) is arranged at the free end of a tongue (22), wherein the tongue is molded onto the base (6) and is bounded by two parallel slits (23) that are formed in the base (6) and that extend in a direction of the button (7).

7. The storage container as claimed in claim 5, further comprising:
    a ramp (21) provided diametrically opposite the retaining cam (16); wherein:
    upon introduction or removal from the storage container, an inner edge section (5c) of the information medium (5) slides on said ramp.

8. The storage container as claimed in claim 7, wherein the support surface (18) is annular and is adjacent to a lower edge of the ramp (21).

9. The storage container as claimed in claim 2, further comprising a transition section (25) molded onto the base (6), said transition section being separated from the unlocking button (7) by at least one slit (27), said transition section having a surface (26) that is substantially flush with the surface (10) of the second limb (9), when the button (7) is in the locked state.

10. The storage container as claimed in claim 9, wherein:
    the transition section (25'') is present on both sides of the unlocking button (7'') and also behind a free end of the second limb (9'') of the unlocking button (7''); and
    the at least one slit (27'') comprises two sections extending along a longitudinal direction of the second limb (9''), and a third section extending behind a free end of the second limb (9''), substantially transverse to said longitudinal direction.

11. The storage container as claimed in claim 9, wherein the at least one slit (27) has two parallel sections which project a distance into the base (6), laterally next to the connecting point between the first limb (8) of the button (7) and the base (6).

12. The storage container as claimed in claim 9, wherein a width of the second limb (9) is less than the width of an average adult human thumb.

13. The storage container as claimed in claim 12, wherein the width of the second limb (9) is in the range from 1 to 3 cm.

14. The storage container as claimed in claim 13, wherein the width of the second limb (9) is in the range from 1.5 to 2.5 cm.

15. The storage container as claimed in claim 1, further comprising a gripping recess (11) formed on a top side of the unlocking button (7).

16. The storage container as claimed in claim 1, wherein:
the unlocking button (7) has a first retaining cam (14) provided on a radially inner portion thereof, the first retaining cam facing a central axis (13) of the lower part (1); and when the button (7) is in the locked state and when an information medium (5) is in the container, the first retaining cam (14) grips over an outer edge section (5a) of to information medium (5) and presses the outer edge section (5a) against a support surface (15) molded onto the base (6).

17. The storage container as claimed in claim 16, wherein:
the unlocking button (7) has a second retaining cam (19) provided radially outward of the first retaining cam (14); and when the button (7) is in the locked state and the cover (2) is closed, the second retaining cam (19) grips over an edge section (20) of the cover (2) and presses the edge section (20) of the cover (2) against a support surface (28) on the inside of the button (7).

18. The storage container as claimed in claim 1, further comprising a cam (49) provided on the cover (2''''), the cam (49) at least partially entering a recess (42) in the lower part (1'''') when the cover (2'''') is closed.

19. The storage container as claimed in claim 1, further comprising a cam (29) provided on the lower part (1'''), the cam at least partially entering a recess (41) in the cover (2''') when the cover (2''') is closed.

20. A storage container for disk-shaped information media comprising:
a lower part (1) having a base (6) provided with a lower surface (6a) that forms an exterior of the storage container;

a cover (2) having an upper surface (2a), the cover being pivotably connected to the lower part; and an unlocking button (7) molded onto the lower part (1), the unlocking button having a first limb (8) connected to the base (6), a second limb (9) connected to the first limb (8), the second limb (9) being longer than the first limb (8) and having an upper surface (10), a first retaining cam (14) and a second retaining cain (19);

wherein in a locked state of the unlocking button with the cover closed:

the first limb (8) projects away from the base (6) in a direction of the cover (2);

the upper surface (10) of the second limb (9) is at least in part substantially flush with the upper surface (2a) of the cover (2);

the first limb (8) is capable of elastic bending deformations in an outward direction, when pressure is exerted on the surface (10) of the second limb (9);

the first retaining cam (14) clamps an edge of an information media disk (5), when said information media disk is present in the storage container; and the second retaining cam (19) clamps the cover (2); and the lower surface (6a) lies in a plane (P) that is spaced apart from the second limb (9); and wherein, when pressure is applied to the unlocking button (7) to open the cover (2), at least a portion of the second limb (9) crosses said plane (P) without contacting remaining portions of the storage container.

* * * * *